United States Patent
Benthien

(10) Patent No.: US 7,173,228 B2
(45) Date of Patent: Feb. 6, 2007

(54) IMAGE SENSOR DEVICE COMPRISING PROTECTION AGAINST OVERFLOW

(75) Inventor: Stephan Benthien, Domene (FR)

(73) Assignee: STMicroelectronics NV., Amsterdam (NL)

( * ) Notice: Subject to any disclaimer, the term of this patent is extended or adjusted under 35 U.S.C. 154(b) by 0 days.

(21) Appl. No.: 10/451,522

(22) PCT Filed: Dec. 18, 2001

(86) PCT No.: PCT/EP01/14999

§ 371 (c)(1),
(2), (4) Date: Dec. 5, 2003

(87) PCT Pub. No.: WO02/51129

PCT Pub. Date: Jun. 27, 2002

(65) Prior Publication Data

US 2004/0070011 A1    Apr. 15, 2004

(30) Foreign Application Priority Data

Dec. 21, 2000  (DE) ............................... 100 63 839

(51) Int. Cl.
*H01L 27/00* (2006.01)
*H04N 5/335* (2006.01)

(52) U.S. Cl. .................................. 250/208.1; 348/308

(58) Field of Classification Search ............. 250/208.1, 250/214 R, 214.1; 348/294, 297–299, 301, 348/302, 304, 308, 314; 257/290–292, 443, 257/445

See application file for complete search history.

(56) References Cited

U.S. PATENT DOCUMENTS

| 6,002,123 | A | 12/1999 | Suzuki |
| 6,204,524 | B1 * | 3/2001 | Rhodes ........................ 257/222 |
| 6,307,195 | B1 * | 10/2001 | Guidash ................... 250/208.1 |
| 6,438,276 | B1 * | 8/2002 | Dhuse et al. ............... 382/312 |

FOREIGN PATENT DOCUMENTS

EP    0863663 A    9/1998

OTHER PUBLICATIONS

International Search Report from co-pending PCT application No. WO 02/51129 (PCT/EP01/14999), filed Dec. 18, 2001.

* cited by examiner

*Primary Examiner*—Kevin Pyo
(74) *Attorney, Agent, or Firm*—Lisa K. Jorgenson; James H. Morris; Wolf, Greenfield & Sacks, P.C.

(57) ABSTRACT

The invention relates to an image sensor device comprising a substrate, formed in CMOS technology, in particular, with an integrated semiconductor structure (ASIC) and, arranged above that, an optically active thin-film structure comprising in each case at least one layer made of doped and undoped amorphous silicon, spatially adjacent pixels in each case being formed in the horizontal plane, which pixels each have an optoelectronic transducer for converting incident light into an electric current proportional to the incident quantity of light, and also a charge store assigned to the optoelectronic transducer, the charge state of which charge store can be varied in a manner dependent on the light incident on the assigned optoelectronic transducer. Taking this as a departure point, the invention is based on the object of further developing an image sensor device of the stated type to the effect of avoiding image distortions in the case of moving objects, which is achieved according to the invention by virtue of the fact that the charge store is a capacitor ($C_{int}$), in which the photocurrent output by the optoelectronic transducer can be integrated during a predetermined measurement duration, and that a switching means ($T_{stop}$) that can be driven by a common control device is provided in each pixel, which switching means can be driven jointly for all the pixels of the image sensor device.

11 Claims, 1 Drawing Sheet

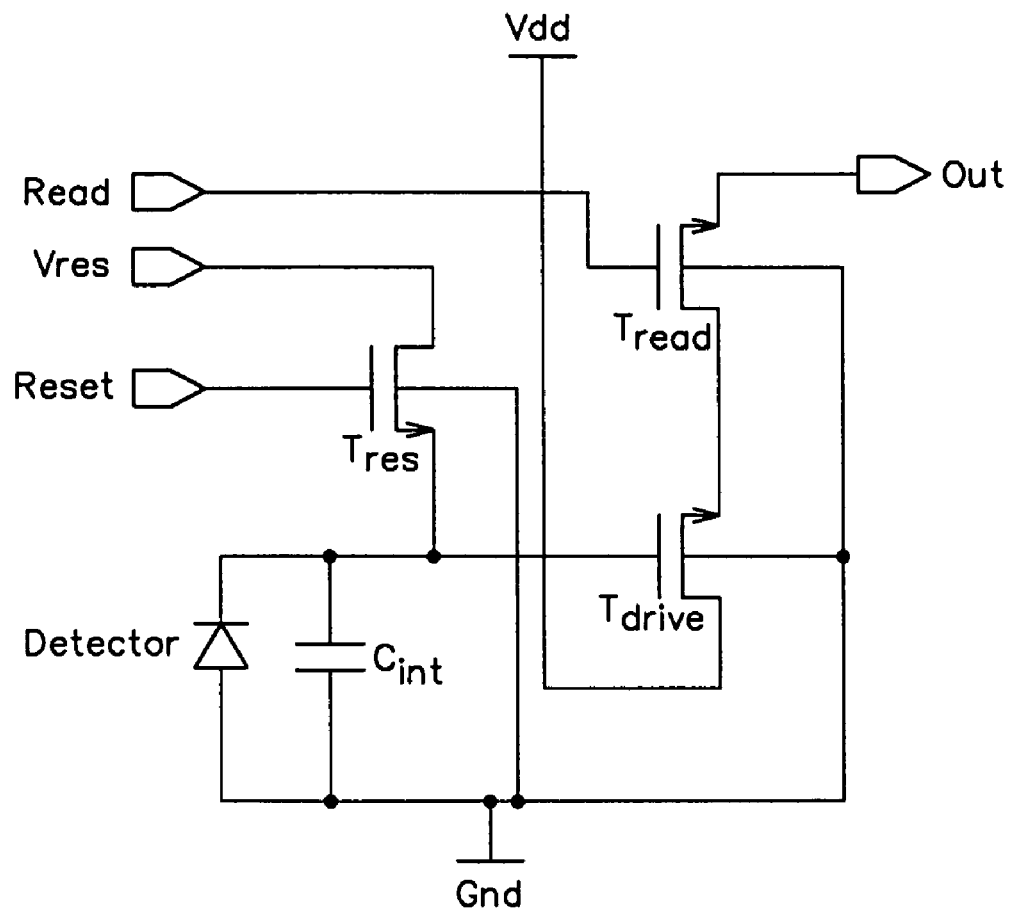
The Figure

IMAGE SENSOR DEVICE COMPRISING PROTECTION AGAINST OVERFLOW

The invention relates to an image sensor device comprising a substrate, formed in CMOS technology, in particular, with an integrated semiconductor structure (ASIC) and, arranged above that, an optically active thin-film structure comprising in each case at least one layer made of doped and at least one made of undoped amorphous silicon, spatially adjacent pixels in each case being formed in the horizontal plane of the image sensor device, which pixels each have an optoelectronic transducer for converting incident light into an electrical signal proportional to the incident quantity of light, in particular an electric current, and also a charge store assigned to the optoelectronic transducer, the charge state of which charge store can be varied in a manner dependent on the light incident on the assigned optoelectronic transducer.

An image sensor device of the type mentioned is known from the art. Such an image sensor comprises a substrate, usually fabricated in CMOS technology, with semiconducting properties and a structure of optically active layers deposited thereon. This technology is also referred to as thin film on ASIC (TFA technology). In image sensors of this type, the optically active layers are situated on the top side of the basic substrate structure, and individual pixels are in each case formed there in a horizontally adjacent manner. Each individual pixel contains an optoelectronic transducer in the form of a photodiode in which the incident light is converted into an electrical signal proportional to the incident quantity of light, in particular an electric current. The quantity of light is detected by means of a charge store assigned to the optoelectrical transducer, the charge state of which charge store is a measure of the quantity of light that has been incident within a specific time duration.

After the measurement time, the so-called integration duration, has elapsed, the measured value from the individual pixel which is present in the charge store is controlled, read out and processed further by peripheral electronics.

One property of such known image sensors is that the use of photodiodes as optoelectronic transducers of the optical sensor has the following disadvantageous effect:

If the photodiode, usually operated in the off state, undergoes transition to the open circuit or to the on state, the photodiode loses its desired effect and an interaction with the photodiodes of the adjacent pixels takes place, so that an image corruption occurs as a result of this. This leads to a white spot on the image sensor in the region of the disturbed pixel. This effect is referred to as so-called "blooming".

Taking this as a departure point, the invention is based on the object of avoiding an image corruption in the individual pixel on account of a transition of the optoelectronic transducer from the off state.

This object is achieved according to the invention by virtue of the fact that the charge store is assigned first and second limiting means for defining in each case an upper and a lower charge limit value.

The invention is distinguished by the fact that, on the one hand, the definition of the upper limit value for the charge store means that an initial state is defined for the integration of the pixel-related measured value, and that, on the other hand, the definition of the lower limit value means that the charge store always has a minimum residual potential which prevents the optoelectronic transducer (i.e. the photodiode) from undergoing transition to the open circuit or the on state. The voltage applied to the charge store for this purpose is at least high enough that the semiconductor switch already undergoes transition to the on state before the voltage of 0 volts is reached at the charge store. This ensures that the voltage across the charge store and thus the voltage across the detector cannot fall below a specific value. As a result of this the detector can no longer attain the open circuit or the on state, thus preventing the disadvantageous "blooming" effect.

Preferred embodiments can be gathered from the subclaims.

The invention is explained in more detail below on the basis of an exemplary embodiment (figure):

The FIGURE illustrates a circuit used in the present invention.

The electronic circuit illustrated in the figure relates to an individual pixel and comprises an optoelectronic transducer which is embodied as a detector and with which a charge store in the form of a capacitor $C_{int}$ is connected in parallel. One of the common terminals is connected to the ground potential $G_{nd}$, and the other common terminal of detector and capacitor is connected to the drain terminal of a semiconductor switch $T_{res}$, whose source terminal is connected to a fixed reference voltage $V_{res}$ and whose gate terminal is connected to a gate input RESET. The remaining elements illustrated in the circuit relate to the operation of reading out the measured value stored in the charge store and are not of importance for the understanding of the present invention.

At the beginning of the measurement operation, a sufficiently high first voltage is applied to the reset input of the semiconductor switch, which voltage causes the semiconductor switch to turn on. The voltage $V_{res}$ is thereby applied to that terminal of detector and capacitor $C_{int}$ which is not at ground potential. This voltage defines the upper charge state of the capacitor $C_{int}$. Consequently, the voltage $V_{res}$ is present as reverse voltage at the detector.

The gate voltage of the semiconductor switch is subsequently reduced to a value which, on the one hand, still lies a little above the reverse voltage of the semiconductor switch but, on the other hand, is so low that the semiconductor switch undergoes transition from the on to the off state. In the following operating phase of the optical sensor, the capacitance $C_{int}$ is discharged by the detector current of the optoelectronic transducer, to be precise until the voltage in the capacitor has fallen to a value of a little above 0 volts. However, before the voltage of 0 volts is reached at the upper terminal of the capacitor $C_{int}$, the semiconductor switch again undergoes transition to the on state, since the voltage present at the control input is greater than the pure reverse voltage. This ensures that a reverse voltage having a minimum magnitude is always present at the detector, so that the latter cannot attain the open circuit or the on state.

The invention claimed is:

1. An image sensor device, comprising: a substrate, formed in CMOS technology, with an integrated semiconductor structure (ASIC) and spatially adjacent pixels in each case being formed in a horizontal plane of the image sensor device, which pixels each have an optoelectronic transducer for converting incident light into an electrical current proportional to an incident quantity of light and also a capacitor assigned to the optoelectronic transducer, the charge state of which capacitor can be varied in a manner dependent on the light incident on the assigned optoelectronic transducer;

wherein the capacitor is assigned first and second limiting means for defining in each case a maximum voltage for the capacitor and a minimum voltage for the capacitor and the optoelectronic transducer;

wherein the first limiting means is a semiconductor switch by means of which a reset voltage can be applied to the capacitor in order to define the maximum voltage for the capacitor and the optoelectronic transducer;

wherein the second limiting means is the semiconductor switch having a control connection which is held at a potentials while the semiconductor switch is in a non-conducting state and the capacitor is being discharged by the detector current of the optoelectronic transducer, such that the semiconductor switch transfers from the non-conducting state to a conducting state in response to a voltage of the capacitor reaching a voltage at which the potential held at the control connection is greater than a pure reverse voltage of the switch.

2. The image sensor device as claimed in claim 1, wherein the first limiting means is a reset means by which a predetermined electrical voltage $V_{res}$ can be applied to the capacitor for a purpose of defining the maximum voltage for the capacitor.

3. The image sensor device as claimed in claim 1, wherein the image sensor device comprises a row of individual pixels.

4. The image sensor device as claimed in claim 1, wherein the image sensor device comprises an areal arrangement of pixels.

5. An image sensor, comprising:
a transducer for converting light into an electrical current;
a capacitor connected with the transducer in parallel; and
a switch having a first terminal, a second terminal, and a control terminal, wherein the first terminal is coupled to a first common terminal of the capacitor and the transducer, the second terminal is coupled to a reset voltage, the control terminal is coupled to a control signal, and a second common terminal of the capacitor and the transducer is connected to ground;
wherein, while the switch is in an off state the capacitor is discharged by the current of the transducer; and
wherein the control signal is set to a voltage while the switch is in the off state such that the switch makes a transition from the off state to an on state in response to a voltage of the capacitor reaching a value at which the voltage set at the control terminal is greater than a pure reverse voltage of the switch.

6. The image sensor of claim 5, wherein a minimum voltage is the voltage of the capacitor at which the voltage present at the control terminal is greater than the pure reverse voltage, and a voltage of the transducer is limited to a range between the minimum voltage and the reset voltage.

7. The image sensor of claim 6, wherein the minimum voltage is slightly higher than zero volts.

8. A method of operating an image sensor comprising an optoelectronic transducer coupled to a capacitor and a switch, the switch having a control terminal, the method comprising:
providing a first control voltage to the control terminal of the switch such that the switch is in an on state;
providing a reset voltage to the capacitor while the switch is in the on state; and
providing a second control voltage to the control terminal of the switch that is lower than the first control voltage such that the switch switches from the on state to an off state and, subsequently, with the second control voltage still being provided to the control terminal of the switch and the capacitor discharging through the optoelectronic transducer, thereby reducing the voltage of the capacitor, the switch switches from the off state to the on state in response to a voltage of the capacitor reaching a voltage at which the second control voltage is greater than a pure reverse voltage of the switch.

9. The method of claim 8, wherein the voltage of the capacitor at which the second control voltage is greater than the pure reverse voltage is a minimum voltage and the voltage of the capacitor is limited to a range between the minimum voltage and the reset voltage.

10. The method of claim 9, wherein the minimum voltage is slightly higher than zero volts.

11. The method of claim 8, wherein the second control voltage is slightly higher than the pure reverse voltage of the switch.

* * * * *